(12) United States Patent
Blais et al.

(10) Patent No.: US 7,775,314 B2
(45) Date of Patent: Aug. 17, 2010

(54) FRONT WHEEL SUSPENSION ON A TWO-WHEEL DRIVE MOTORCYCLE

(75) Inventors: Thomas E. Blais, 22 Fielding Way, Rye, NH (US) 03870; Mark H. Hamilton, Northport, FL (US)

(73) Assignee: Thomas E. Blais, Rye, NH (US)

( * ) Notice: Subject to any disclaimer, the term of this patent is extended or adjusted under 35 U.S.C. 154(b) by 260 days.

(21) Appl. No.: 12/031,285

(22) Filed: Feb. 14, 2008

(65) Prior Publication Data

US 2009/0205895 A1 Aug. 20, 2009

(51) Int. Cl.
*B62M 7/02* (2006.01)
(52) U.S. Cl. .................................. 180/224; 180/227
(58) Field of Classification Search .............. 180/222, 180/223, 224, 227
See application file for complete search history.

(56) References Cited

U.S. PATENT DOCUMENTS

| | | | |
|---|---|---|---|
| 2,752,168 A | 6/1956 | Torre | |
| 3,199,623 A * | 8/1965 | Mangum | 180/224 |
| 3,989,261 A | 11/1976 | Kawaguchi | |
| 4,433,850 A | 2/1984 | Miyakoshi et al. | |
| 4,444,406 A | 4/1984 | Isono | |
| 4,526,249 A | 7/1985 | Parker | |
| 4,572,534 A | 2/1986 | Heyl | |
| 4,702,340 A | 10/1987 | Hamilton | |
| 4,875,543 A | 10/1989 | Verkuylen | |
| 5,054,572 A * | 10/1991 | Parker | 180/224 |
| 5,069,303 A | 12/1991 | Fuller | |
| 5,113,964 A | 5/1992 | Yamauchi | |
| 5,361,864 A | 11/1994 | Tanaka | |
| 5,417,305 A | 5/1995 | Parker | |
| 5,456,480 A | 10/1995 | Turner et al. | |
| 5,485,893 A | 1/1996 | Summers | |
| 5,782,313 A | 7/1998 | Kurawaki et al. | |
| 6,182,991 B1 | 2/2001 | Christini et al. | |
| 6,263,994 B1 | 7/2001 | Eitel | |
| 6,505,699 B1 | 1/2003 | Christini et al. | |

* cited by examiner

*Primary Examiner*—Kevin Hurley
(74) *Attorney, Agent, or Firm*—Andrus, Sceales, Starke & Sawall, LLP (57) ABSTRACT

A two-wheel drive motorcycle, or all wheel drive bicycle, has a spring loaded shock absorbing suspension and traction system for the front wheel. A swing arm, rather than the front steering fork, is mounted to the front wheel axle. A modified steering fork is mounted to the swing arm and a shock absorber extends between the front steering fork weldment and the swing arm. The shock absorber allows the front wheel axle to move upward relative to the front steering fork and motorcycle (or bicycle) in general to absorb upward shocks on the front wheel, and also pushes the wheel downward, thereby improving traction. The front chain drive includes two chains in series which are isolated from excessive shock forces.

12 Claims, 7 Drawing Sheets

FRONT WHEEL SUSPENSION ON A TWO-WHEEL DRIVE MOTORCYCLE

FIELD OF THE INVENTION

The invention relates primarily to two-wheel drive motorcycles typically used off-road. More specifically, the invention relates to a shock absorbing suspension system for motorcycles having a front wheel drive mechanism, such as a chain drive or belt drive. The invention can also be used when appropriate for all wheel drive bicycles.

BACKGROUND OF THE INVENTION

Figure 1:
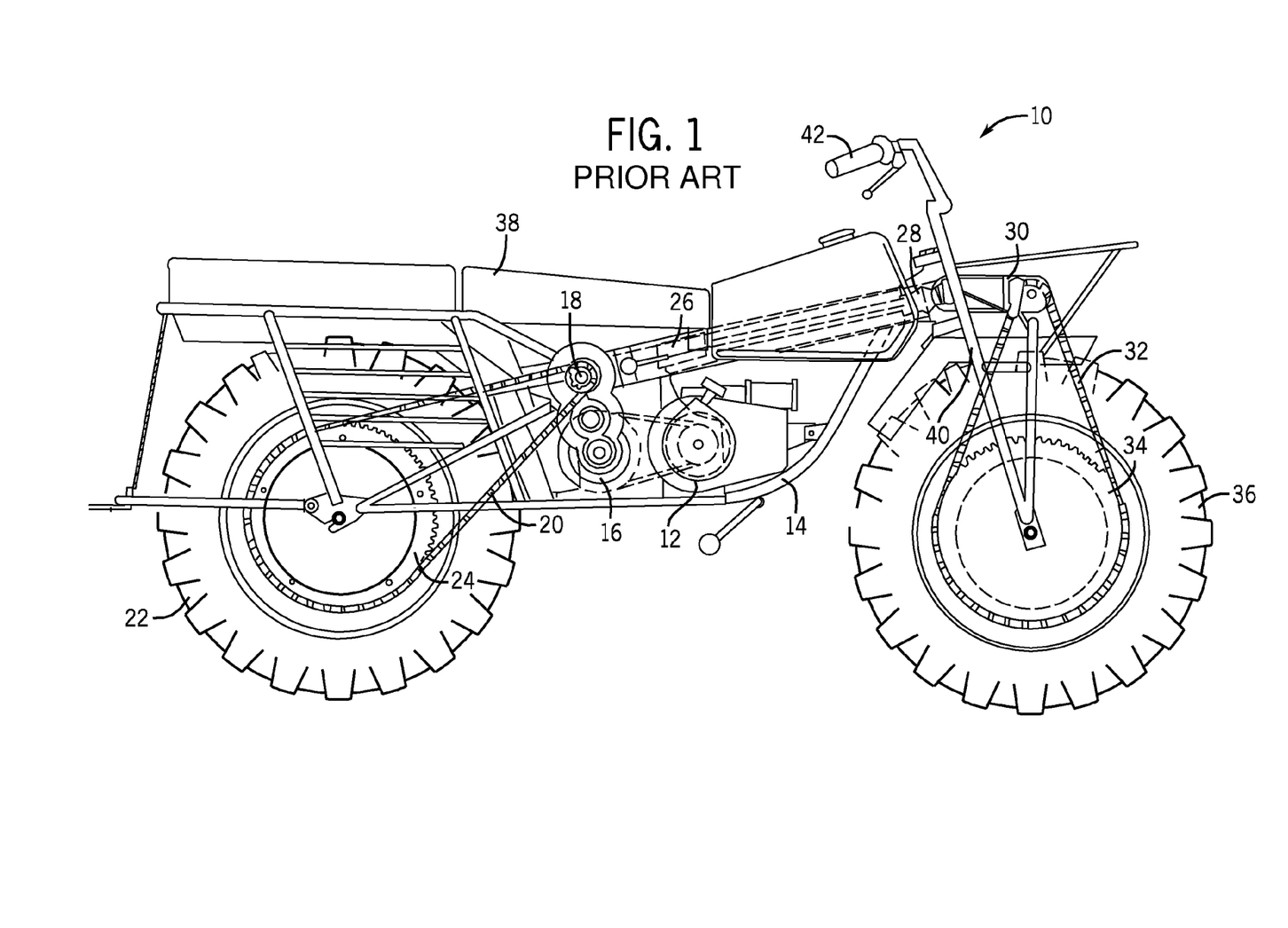
FIG. 1 is a side elevational view of a two-wheel drive motorcycle constructed in accordance with the prior art, depicting the overall drive train for the front and rear wheels.

Prior art FIG. 1 illustrates a two-wheel drive motorcycle 10 of the type manufactured by the assignee of the present application. The motorcycle 10 is designed to be particularly adept at maneuvering over rough terrain at relatively low speeds, e.g., up to about 35 to 40 mph. For example, the front wheel drive feature facilitates climbing over steep, rough terrain. The general operation of the prior art motorcycle 10 shown in FIG. 1 is described in U.S. Pat. No. 4,702,341 and U.S. patent application Ser. No. 11/503,587, both of which are assigned to the assignee of the present application and are incorporated herein by reference. Briefly, in reference to prior art FIG. 1, the motorcycle 10 has an engine 12, mounted to the frame 14, that provides power to a transmission 16 via a belt drive torque converter. The transmission 16 has a rear output shaft 18 to which is connected a sprocket for a chain 20 that drives a sprocket 24 secured to the rear wheel 22. The sprocket 24 on the rear wheel 22 preferably has 60 teeth. The transmission 16 also has another output shaft facing forward (not shown in FIG. 1) which provides power through a one-way overrunning clutch mechanism 26, a universal joint 28, and miter gears 30 to a front wheel chain drive 32. Chain 32 drives a sprocket 34 secured to the front wheel 36. The sprocket 34 on the front wheel 36 also preferably has 60 teeth. For purposes of illustration, FIG. 1 shows the sprocket 24 on the rear wheel 22 and the sprocket 34 on the front wheel 36 on the same side of the motorcycle 10. In practice, the sprocket 24 for the rear wheel 22 and sprocket 34 for the front wheel are located on opposite sides of the motorcycle 10 in order to balance torque. The power ratio between the rear wheel 22 and the front wheel 36 is preferably maintained at a ratio of about 1:1, with the overrunning clutch 26 providing slip for the front wheel drive and allowing the front wheel to turn faster than the rear as required when the motorcycle is making a turn.

As mentioned, the type of motorcycle 10 shown in FIG. 1 is typically used off road often to contemplate rough or steep terrain, or to haul heavy objects. The seat 38 on motorcycle 10 is typically mounted to the frame 14 using a spring loaded shock absorber, which is not shown in the FIG. 1. The shock absorber provides a relatively smooth ride to the user even when the rear wheel 24 encounters rough terrain. However, two-wheel drive motorcycles of the type shown in FIG. 1 do not incorporate the ability to absorb shock impacting the front wheel. The difficulty of absorbing shocks impacting the front wheel 36 resides mostly in the fact that the sprocket-to-sprocket distance for the front wheel chain drive 32 must be maintained during the course of operation to ensure proper chain tension. Providing shock absorbers within the front steering fork 40 is impractical because it would necessarily require the sprocket-to-sprocket distance for the front wheel chain drive 32 to vary.

Sudden impact on the front wheel 36 even at moderate speeds can produce normal forces many times greater than the forces predicted for typical weights and traction. At these instants, the rider may lose traction of the front wheel 36. Often, users will use low pressure tires, or under inflate tires to say 3 to 5 psi to improve traction when rough terrain is expected.

Also, repeated impact of the front wheel can lead to premature failure of the front wheel chain drive. Designing a front wheel chain drive with sufficient strength to handle large and unpredictable shock forces and torques is difficult.

SUMMARY OF THE INVENTION

The invention is a front wheel shock absorbing suspension system for an all wheel drive vehicle such as a two-wheel drive, off-road motorcycle. The invention absorbs shock impacting the front wheel which helps protect the motorcycle from premature damage including damage to the steering and drive mechanisms, and also smoothes the ride for the user especially when encountering rough terrain. For example the invention is especially well adapted to absorb impact when the vehicle lands on its front wheel. The invention not only absorbs shock impacting the front wheel, but also has been found to improve traction of the front wheel when traveling over rough terrain. The invention therefore allows drivers to drive more aggressively for given conditions.

In the preferred embodiment of the invention, a rigid U-shaped swing arm is connected to the front wheel axle of a two-wheel drive motorcycle. The arms of the swing arm are connected to the axle on either side of the front wheel, and the U-shaped swing arm wraps rearward around the front wheel. The swing arm is able to pivot about the axle for a limited arc, for example about 16° above horizontal and about 16° below horizontal. The front steering fork for the motorcycle is modified so that the distal ends of the fork are pivotally mounted to the swing arm, rather than to the front wheel axle, as is conventional. A shock absorber is connected to and extends between a location on the steering fork and a location on the swing arm. The shock absorber preferably includes a dampening element and a compressed spring element, as is conventional. To turn the vehicle, a rider uses the handlebars to turn the steering fork, which than applies steering torque to the swing arm which is connected to the front wheel axle to turn the front wheel. When the front wheel encounters a sudden impact, the shock absorber compresses, allowing the front wheel axle to move upward relative to the front steering fork and motorcycle frame to absorb the shock. In addition, it is believed that increased resistance automatically and instantaneously causes increased torque which in turn causes the second chain to drive the front wheel downward and increase traction. On the other hand, when the pressure or force on the front wheel is reduced or removed from the front wheel, the spring in the shock absorber pushes the swing arm downward, and in turn the front wheel axle and the front wheel downward with respect to the steering fork and the frame, thereby improving traction as power continues to be supplied from the engine and front wheel drive system to the front wheel.

In the preferred embodiment of the invention, the front wheel drive system is a chain drive system having two separate drive chains, which are preferably installed on the opposite side of the front wheel from the shock absorber. A double sprocket with bearings pivots on the cantilevered swing arm on the side of the wheel that the drive system is located. The double sprocket with a bearing is mounted at the same pivotal location that the distal arm of the front steering fork is mounted to the swing arm. The first drive chain is installed around a sprocket extending from the front miter gear box located in front of the steering column and one of the sprockets on the bearing mounted on the swing arm. The distance between the sprockets for the first drive chain remains fixed even when the front wheel encounters impact. The second drive chain extends between a sprocket mounted on the front wheel, preferably a 60-tooth sprocket, and the other sprocket on the double sprocket mounted at the pivotal location of the front fork to the swing arm. Likewise, when the front wheel encounters impact to compress the shock absorber, the distance between the sprockets for the second drive chain does not change. The front chain drives, as well as the entire front end of the motorcycle, is therefore better protected against premature damage from sudden impact forces.

In another aspect of the invention, the invention is a retrofit kit containing components for retrofitting a prior art chain driven two-wheel drive motorcycle with the front wheel suspension and traction system described above. The kit preferably comprises a swing arm, a modified front fork, a double sprocket with bearing and first and second drive chains, as well as an appropriate shock absorber.

The invention is not intended to be limited to use on motorcycles. For example, a front suspension system and retrofit kit in accordance with the invention can also be used in connection with all wheel drive bicycles.

Other features and advantages of the invention may be apparent to those skilled in the art upon reviewing the following drawings and description thereof.

DETAILED DESCRIPTION OF THE DRAWINGS

FIGS. 2-7 show a motorcycle 110 constructed in accordance with the preferred embodiment of the invention. The motorcycle 110 as described herein has both front and rear wheel drive, and is adaptable for many uses including substantial off road use. Many aspects and components of the motorcycle 110 are similar to the prior art motorcycle 10 shown in FIG. 1 and described in the above-referenced and incorporated patents, U.S. Pat. No. 4,702,340 and U.S. patent application Ser. No. 11/503,587, and reference should be made to the above-incorporated patent and pending patent application for a more in-depth discussion of those aspects and components. The primary differences between the motorcycle 110 shown in FIGS. 2-7 and the prior art motorcycle 10 shown in FIG. 1 relate to the improved front wheel suspension and traction system.

Figure 2:
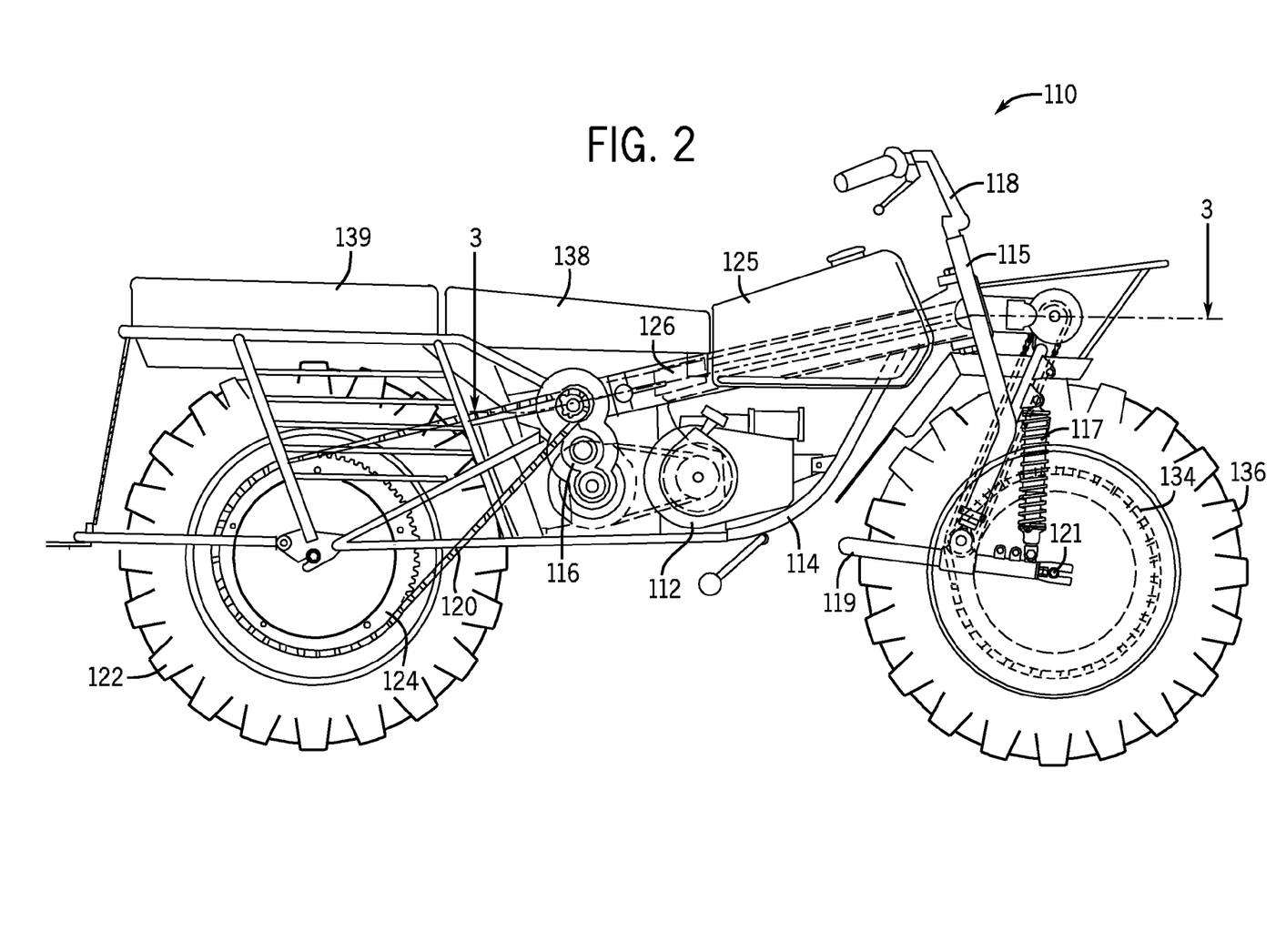
FIG. 2 is a side elevational view of a two-wheel drive motorcycle having a front wheel chain drive and shock absorbing suspension system constructed in accordance with a preferred embodiment of the invention.

Referring now to FIG. 2, the preferred motorcycle 110 has a tubular frame 114 that is substantially the same as in the prior art. A front steering fork weldment 115 is pivotally mounted to a front end of the frame 114 in the conventional manner. Handlebars 118 are connected to the steering fork 115 to turn the steering fork 115 and steer the motorcycle 110. The configuration of the steering fork 115 is modified so that the arms 117 on the steering fork connect to the swing arm 119 rather than to the axle 121 of the front wheel 136.

As mentioned previously, the motorcycle 110 drives the rear wheel 122 directly from the transmission 116 using a rear wheel chain drive 120, and drives the front wheel 136 via a one-way, overrunning clutch drive 126, a universal joint 128, front miter gears 142, and a front wheel chain drive, as will be discussed in more detail below. The rear wheel 122 has a sprocket 124 mounted to its hub, and the front wheel 136 has a sprocket 134 mounted to its hub. The wheel mounted sprockets 124, 134 are preferably 60-tooth sprockets. Preferably, the power ratio between the rear and the front wheels is maintained at about 1:1. The overrunning clutch 126 provides slip for the front wheel 136 when turning, or when otherwise necessary. The gas tank 125 and seats 138 and 139 are attached to the top of the frame 114. The seats 138 and 139 are preferably mounted using a shock absorber, as is known in the art. The lower end of the frame 114 supports the engine 112 and a transmission 116. The transmission 116 preferably includes a shift knob, as is described in the prior art incorporated patent and patent application. The engine 112 provides power to the transmission 116 via a belt and pulley torque converter. Preferably, the shift knob is operated by the driver to set the transmission into one of three different forward gear positions, or alternatively, into one or more neutral positions.

Figure 3:
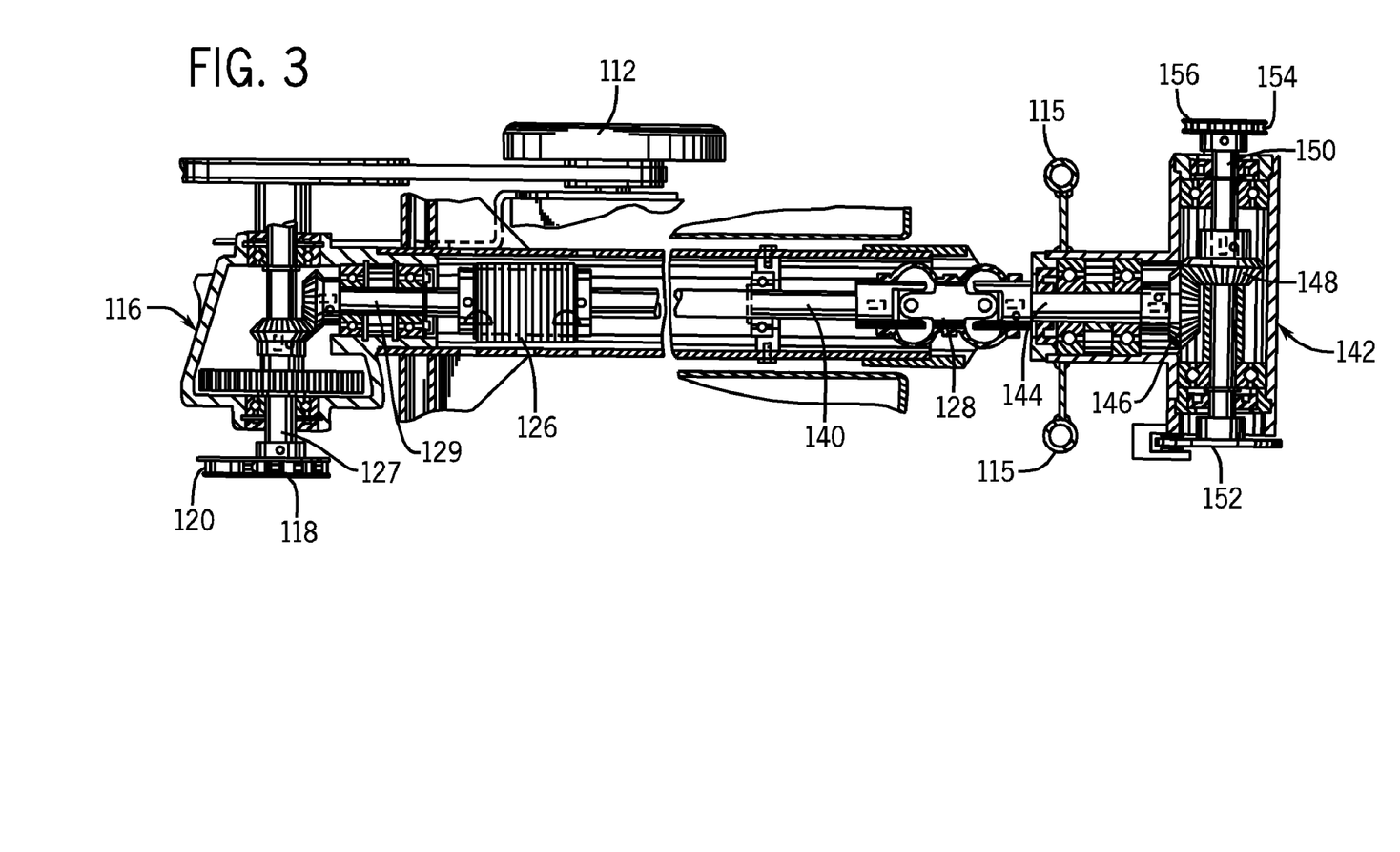
FIG. 3 is a cross-sectional view taken along line 3-3 in FIG. 1 showing details of the drive system.
Figure 4:
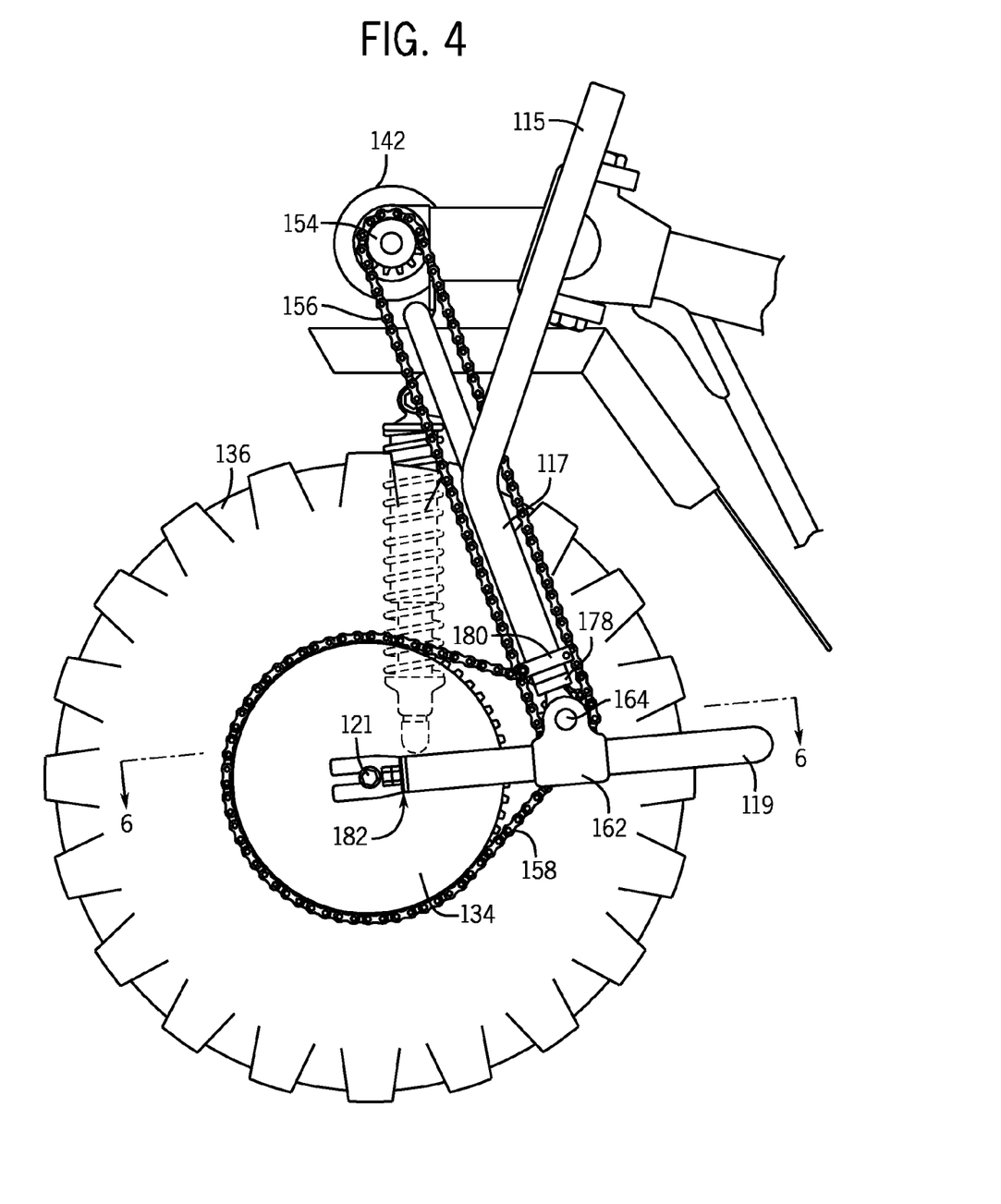
FIG. 4 is a left side elevational view of the front end of the motorcycle shown in FIG. 2 which details a two-chain drive for the front wheel in accordance with the preferred embodiment of the invention.
Figure 5:
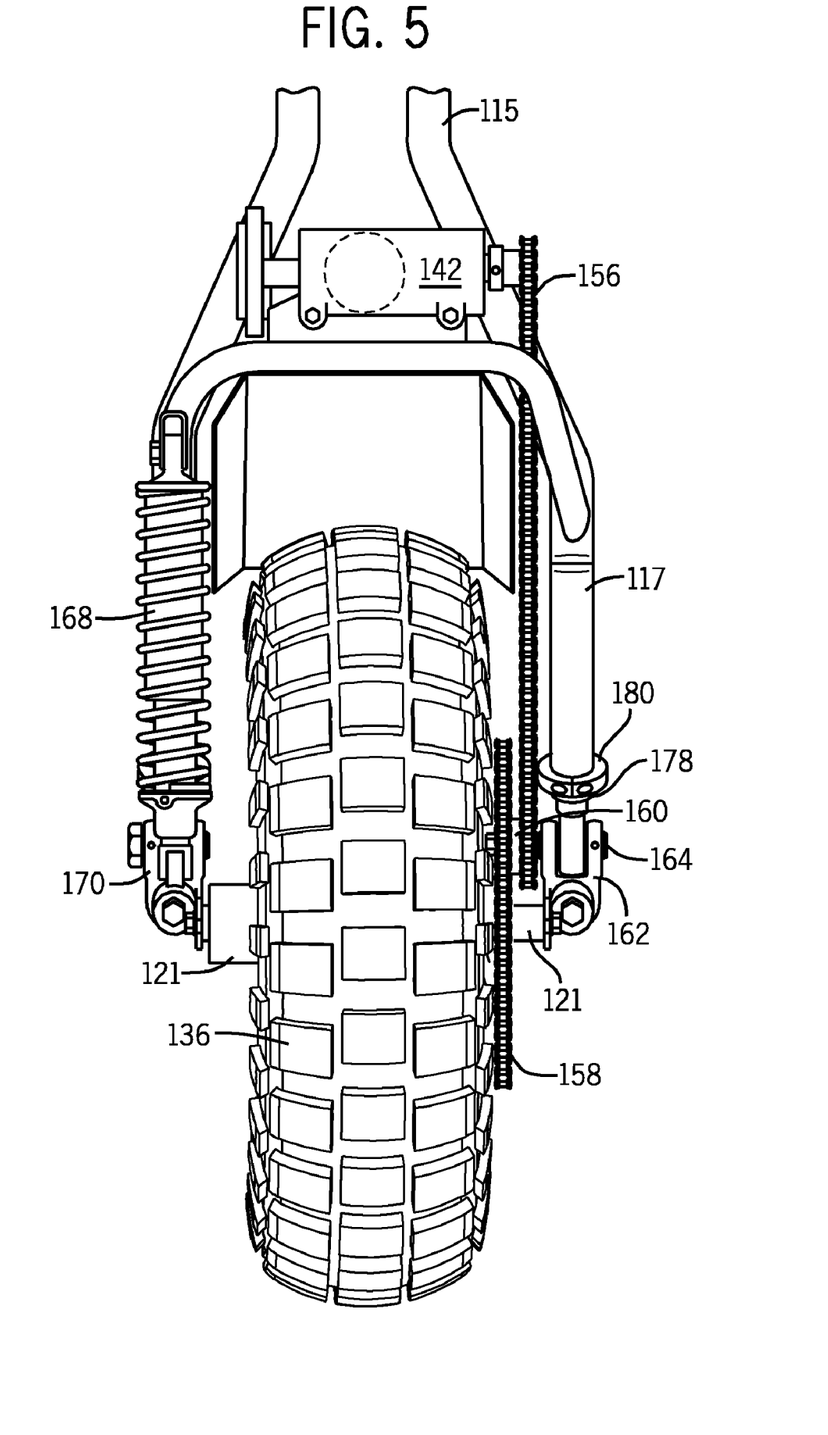
FIG. 5 is a front elevational view of the motorcycle shown in FIG. 2.
Figure 6:
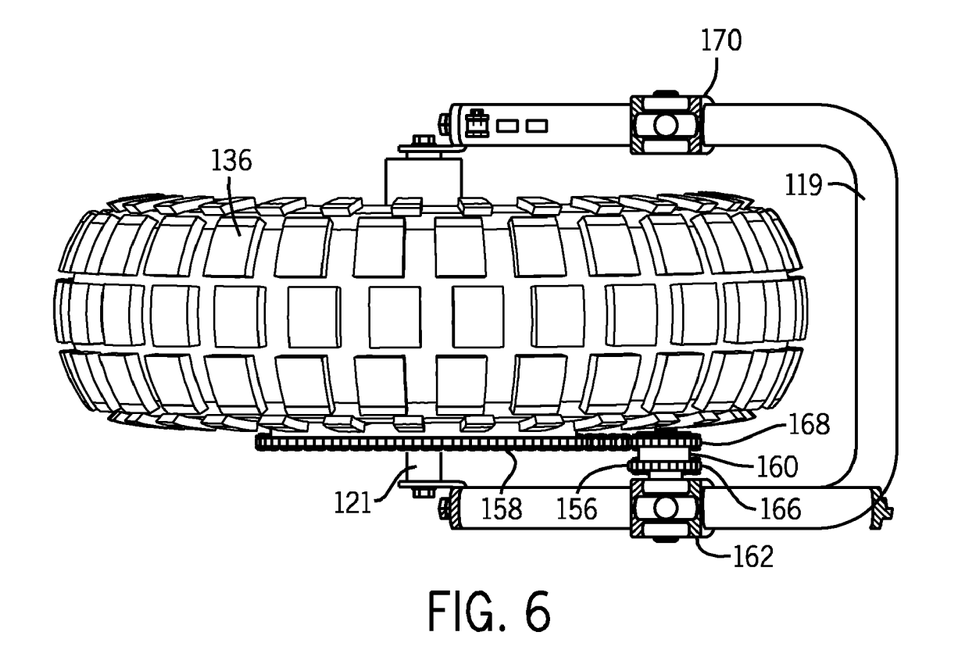
FIG. 6 is a partial cross-section view taken along line 6-6 in FIG. 4.

Referring to FIG. 3, the transmission 116 has a rear transmission output shaft 127 and a front transmission output shaft 129. A sprocket 118 is mounted to the rear transmission output shaft 127. The rear chain drive 120 engages the sprocket 118 on the transmission rear output shaft 127.

The front transmission output shaft 129 connects to the one-way wrap spring (overrunning) clutch 126, through which power and torque from the front transmission output shaft 129 is translated to shaft 140. As mentioned, the clutch 126 is designed to slip (or overrun) when the front wheel 136 is rotated at a faster rate than the rear wheel 122, such as when turning. Shaft 140 is connected at its other end to a universal joint 128 that translates power and torque from the shaft 140 to the front miter box 142 via shaft 144. The universal joint 128 allows the front drive train to continue transmitting power and torque even when the front steering forks are turned to turn the motorcycle. The purpose of the miter box 142 is to translate power and torque from the forward direction to a direction perpendicular to the forward direction. Upon entering the front miter box 142, the shaft 144 terminates with a connection to a first front miter gear 146. The first front miter gear 146 and a second front miter gear 148 comprise a pair of miter gears that translate power and torque perpendicularly to the front drive shaft 150. One end of the front wheel drive shaft 150 is connected to a disc brake 152. The other end of the front wheel drive shaft 150 is connected to a sprocket 154 that is disposed for connection to a first drive chain 156. The sprocket 154 is similar to the sprocket 118 used for the rear drive. Sprockets 118, 154 preferably have 11 teeth.

More details of how the various components of the transmission and the front and rear drive trains are assembled are described in the above referenced and incorporated issued patent and pending patent application.

Referring now in particular to FIGS. 4-7, power and torque are transmitted from the miter box 142 to the front wheel 136 via a first chain drive 156 and a second chain drive 158 that are connected in series through a dual idler sprocket with bearing 160. Pivot fitting 162 is connected to the swing arm 119. Connection shaft 164 pivotally connects the arm 117 of the steering fork 115 to the fitting 162. The pivot shaft 164 extends inward from the pivot fitting 162, and the dual sprocket bearing 160 is mounted to the extended portion of the pivot shaft 164. The double sprocket with bearing 160 preferably consists of double sprockets made of high strength steel, e.g., S-1141 steel with a black oxide finish having a hardness of RC-40/50. Each sprocket preferably comprises 13 teeth. A high quality bearing, such as a heavy duty needle bearing, e.g. purchased from Applied Industrial Technologies Part No. HJ-122-016.2RS, is press fit into a double sprocket member to form the dual sprocket bearing 160. Note that it is important that the pivot shaft 164 have sufficient strength to withstand relevant forces. As described in more detail below, the location of the pivot shaft 164 remains fixed with respect to the steering fork arm 117, and generally, except for the effect of turning, fixed with respect to the frame 114 of the motorcycle 110. The first drive chain 156 extends between the sprocket 154 on the miter box 142 and the first sprocket 166 on the dual idler sprocket 160. The distance between the sprocket 154 on the miter box 142 and the sprocket 166 of the dual idler sprocket mounted at the pivot connection at the base of the arm 117 of the steering fork 115 remains fixed under normal operation of the motorcycle 110. The sprockets 154 and 166, as well as the first chain 156, remain in the same plane as each other as the user steers the motorcycle 110 by turning the steering fork 115. The second drive chain 158 extends between the second sprocket 168 on the dual idler sprocket 160 and the large 60-tooth sprocket 134 on the front wheel 136. The sprocket 134 is secured to the hub of the front wheel 136, as is known in the art. The distance between the sprocket 168 on the dual idler sprocket 160 and the large sprocket 134 on the front wheel 136 is fixed during normal operation of the motorcycle 110. The chain drive system for the front wheel 136 is located on the left side of the front wheel 136.

A shock absorber 168 is located on the right side of the front wheel 136. The shock absorber 168 is a spring loaded shock absorber that provides both dampening and spring resistance as is known in the art. The preferred shock absorber 168 is the same the shock absorber used to mount the seat 138 to the frame 114, which can be purchased from Chemex Industrial Co., Ltd., Taiwan.

On the right side of the front wheel 136, the arm 117 of the steering fork 115 is mounted to the swing arm 119 using pivot fitting 170. Pivot fitting 170 is preferably similar to pivot fitting 162, except that the shaft 172 to which the lower arm 117 of the front steering fork 115 is mounted, does not extend substantially beyond the pivot fitting 170, as is the case with shaft 164 and pivot fitting 162 on the left side of the front wheel 136 to accommodate for the dual sprocket bearing 160. As shown best in FIG. 7, an upper end of the shock absorber 168 is mounted to a location 174 on the front steering fork 115 weldment. This location 174 rotates as the front steering fork 115 rotates to turn the front wheel 136, but remains in a fixed relative position with respect to the steering fork 115. The lower end of the shock absorber 168 is mounted to a location 176 on the swing arm 119. The shock absorber 168 is preferably mounted using conventional nuts and bolts at both the upper location 174 to the steering fork weldment 115 and at the lower location 176 to the swing arm 119. The location 176 to which the shock absorber 168 is attached to the swing arm 119 is located between the axle 121 of the front wheel 136 and the pivot connection 170. As mentioned, the location of the pivot connection 170 and connecting shaft 172 remains fixed with respect to the steering fork 115 at the distal end of the arm 117 of the steering fork 115. On the other hand, the front axle 121 is able to move with respect to the position of the pivot connection shaft 172 up and down substantially along an arc. The shock absorber 168, however, dampens and resists rotation movement of the swing arm 119 in relation to the front steering fork weldment 115, and thus dampens and resists motion of the front wheel axle 121 and front wheel 136 in relation to the front steering fork.

The swing arm 119 is preferably made of ⅞ inch, 14 gauge steel tubing to provide the swing arm 119 with sufficient strength to withstand the rigors of off road or on road use.

In operation, the front wheel axle 121 moves up and down with respect to the front fork 115 as the front wheel 136 encounters rough terrain. For example, when the front wheel 136 suddenly impacts an object, the impact forces cause the front wheel axle 121 to move upward against the resistance force of the shock absorber 168, thereby causing the swing arm 119 to rotate, in a counter-clockwise direction as viewed from the perspective of FIG. 7 (or in a clockwise direction as viewed from the perspective of FIG. 4). The amount of shock force transmitted to the front steering fork 115 is therefore substantially less than in the prior art systems in which the front steering fork 115 was connected directly to the front wheel axle 121. Furthermore, the relative motion between the first drive chain 156 and second drive chain 158 on the left-hand side of the front wheel substantially isolates the drive chains 156, 158 from the effects of impact on the front wheel. In the prior art systems, impact forces may cause the sprocket-to-sprocket distance to change or vibrate, thus resulting in premature damage over the long term to the drive system. However, in the preferred embodiment of the invention, the shock absorber 168 absorbs the impact forces while the drive chains 156 and 158 are exposed individually to less shock due to the fact that the dual sprocket bearing 160 is allowed to pivot freely at the pivot connection 164 thereby allowing the second drive chain 158 to rotate as needed with respect to the first drive chain 156.

The shock absorber 168, however, not only absorbs shocks, but also applies downward pressure to improve traction on the front wheel 136 when the load on the front wheel is less than the spring force of the shock 168. Therefore, the invention not only has the advantage of reducing shock forces to the front wheel drive system and the motorcycle 110, but also has the advantage of improving traction over rough terrain. This allows the driver to negotiate more difficult terrain and drive more aggressively under given conditions without experiencing excessive shock and also with improved traction.

It is well known that chains may wear and lengthen after long periods of operation, and therefore it is desirable to allow the user to adjust the sprocket-to-sprocket distance for the first chain drive 156 as well as for the second chain drive 158. For the first chain drive 156, chain tension adjustment is preferably accomplished through the use of telescoping or threaded extender rods 178 at the distal end of the arms 117 of the steering forks 115. To adjust chain tension, clamp collars 180 are removed, and the length of the extender threaded rod 178 is adjusted. The collars 180 are then clamped in place to assure that the length of the front fork 117 does not change during operation. Preferably, the distance between the front wheel axle 121 and the connection shaft 164 which holds the dual idler sprocket 160 is adjusted in a somewhat similar fashion. In other words, it is preferred that the front end 182 of the swing arm be adapted with telescoping or threaded extenders as is known in the art.

Figure 7:
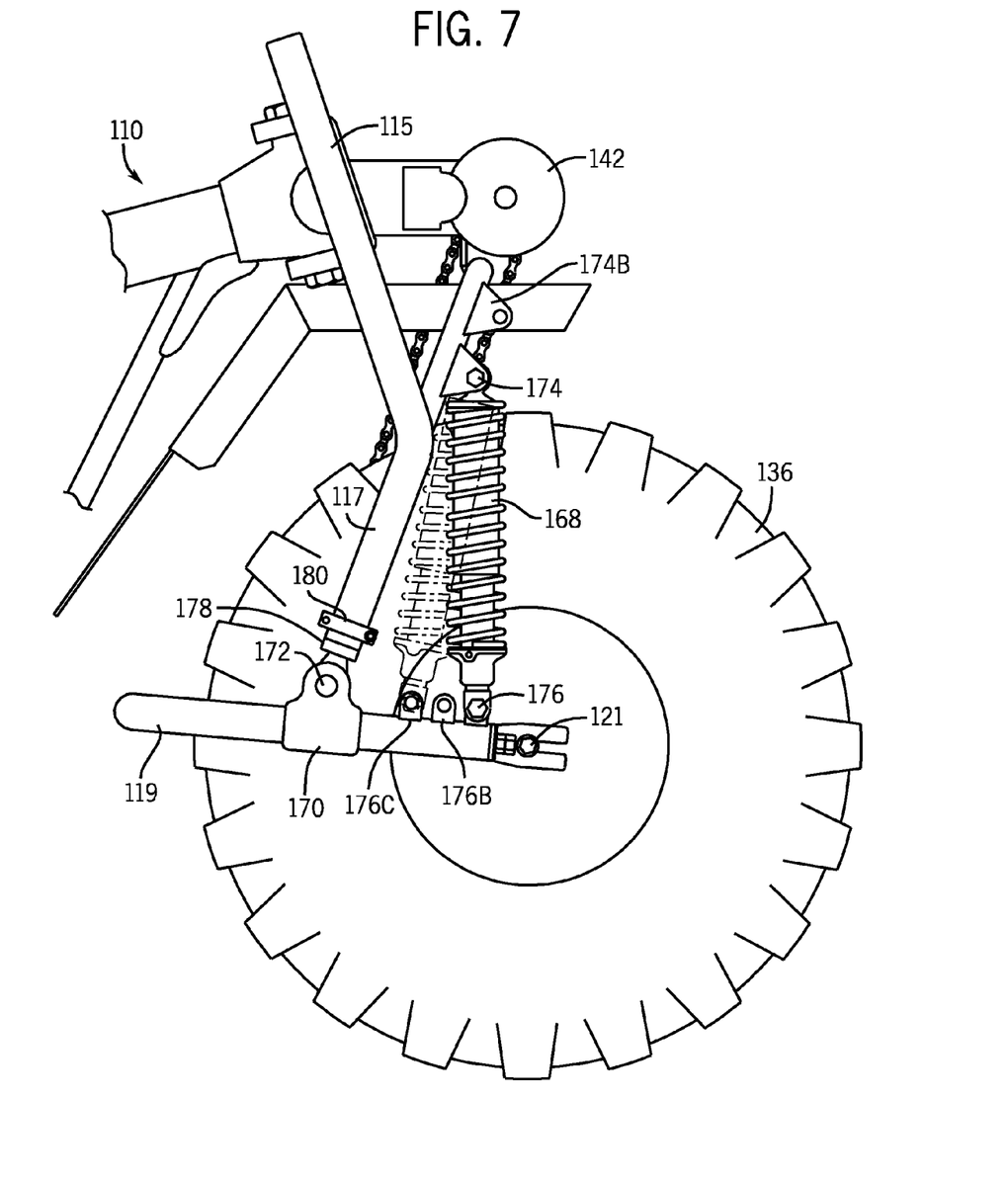
FIG. 7 is a right side elevational view of the front end of the motorcycle shown in FIG. 2 depicting the mounting of a shock absorber between a front steering fork weldment and a swing arm as in accordance with the preferred embodiment of the invention.

Referring to FIG. 7, mounting locations 174, 176 for the shock absorber 168 are preferably selected and fixed at the factory. It has been found to be sufficient to allow the user to adjust the tension of the shock absorber 168 itself in order to adjust the front suspension system. Alternatively, as shown in FIG. 7, the steering fork weldment 115 may include not only one mounting location 174 but also a second mounting location 174B at a different height on the steering fork weldment 115. Also, the swing arm 19 may include additional mounting locations 176B, 176C in addition to mounting location 176. In this alternative embodiment, the upper mounting location 174B on the front fork weldment 115 would cause less stiffness than the lower mounting location 174. Likewise, the mounting locations 176B and 176C on the swing arm 119 would cause less stiffness than the front mounting location 176.

Because of the substantial advantages of the invention, it may be desirable for owners of prior art motorcycles 10 of the type shown in FIG. 1 to retrofit the motorcycle in accordance with the invention. A kit for implementing such a retrofit would preferably include the following components described in FIGS. 2-7: a modified front fork weldment 115, a swing arm 119, pivot connections for the front fork weldment 115 and the swing arm 119, a dual idler sprockets with bearing 160 mounted at the pivot connection on the chain drive side of the wheel, a first chain drive 156 and a second chain drive 158. Also, it may be desirable to provide a modified sprocket 154 and/or output shaft 150 for the miter box 142 to accommodate for the slightly larger distance that the first chain drive 156 is located from the miter box 142 compared to in the conventional prior art system shown in FIG. 110.

The preferred embodiment of the invention has been described herein, but it should be understood that components or features of the invention may be modified and such modifications are intended to be within the scope of the invention. For example, while the invention is disclosed in connection with a dual chain drive for the front wheel, other types of front wheel drive systems may be used to carry out certain aspects of the invention, although the dual chain drive is the preferred system.

We claim:

1. A vehicle comprising:
   a frame;
   a front wheel with an axle;
   a swing arm connected to the front wheel axle and extending rearward from the axle;
   a steering fork having an upper portion that is pivotally mounted to the frame for steering the front wheel and two arms extending substantially downward from the upper portion, a distal portion of each arm being pivotally connected to the swing arm;
   a shock absorber connected to and extending between a location on the fork and a location on the swing arm; and
   a drive mechanism for providing power to drive the front wheel, the drive mechanism for the front wheel comprising a chain drive system;
   wherein the shock absorber is located on one side of the front wheel and the chain drive system is located on the other side of the front wheel.

2. A vehicle as recited in claim 1 wherein:
   the drive mechanism for the front wheel comprising a chain drive system having two chains, and a bearing having dual sprockets mounted so that the central axis of the bearing is substantially aligned with the pivoting axis at the connection of the fork arm to the swing arm; and
   further wherein the first chain extends between a front wheel drive output sprocket and the dual idler sprocket, and the second chain extends between a sprocket mounted on the front wheel and the dual idler sprocket.

3. A vehicle as recited in claim 1 wherein the vehicle is a motorcycle that further comprises a one-way clutch that transmits power from an engine and transmission to the front wheel drive mechanism.

4. A vehicle as recited in claim 2 wherein the vehicle further comprises means for adjusting the distance between the front wheel drive output sprocket and the dual idler sprocket to which the first chain is installed.

5. A vehicle as recited in claim 2 wherein the vehicle further comprises means for adjusting the distance between the sprockets to which the second chain is installed.

6. A vehicle as recited in claim 1 wherein the fork includes at least two brackets providing mounting locations for the top end of the shock absorber.

7. A vehicle as recited in claim 1 wherein the swing arm includes at least two brackets for mounting a lower end of the shock absorber to the swing arm.

8. A vehicle as recited in claim 1 wherein the front wheel drive mechanism is dual chain drive mechanism comprising:
   a front drive sprocket connected to an output shaft of a front miter box;
   a front drive sprocket connected to a first drive chain;
   a bearing affixed to the swing arm at the location that the fork arm connects to the swing arm, the bearing having dual sprockets which operably connects the first drive chain to a second drive chain; and
   a sprocket on the front wheel to which the second drive chain is mounted to provide front wheel drive power to the vehicle.

9. A vehicle as recited in claim 1 wherein the swing arm is substantially U-shaped.

10. A vehicle as recited in claim 1 wherein the shock absorber provides dampening as well as spring extension forces.

11. A vehicle as recited in claim 1 wherein the vehicle is a motorcycle.

12. A vehicle as recited in claim 1 wherein the vehicle is a bicycle.

* * * * *